(12) United States Patent  
Maurer

(10) Patent No.: US 9,114,684 B2  
(45) Date of Patent: Aug. 25, 2015

(54) LEVELING METHOD AND SYSTEM WITH VELOCITY COMPENSATION

(71) Applicant: Parker-Hannifin Corporation, Cleveland, OH (US)

(72) Inventor: Garrett Maurer, Maplewood, MN (US)

(73) Assignee: Parker-Hannifin Corporation, Cleveland, OH (US)

(*) Notice: Subject to any disclaimer, the term of this patent is extended or adjusted under 35 U.S.C. 154(b) by 0 days.

(21) Appl. No.: 14/200,423

(22) Filed: Mar. 7, 2014

(65) Prior Publication Data

US 2014/0265173 A1 Sep. 18, 2014

Related U.S. Application Data

(60) Provisional application No. 61/778,508, filed on Mar. 13, 2013.

(51) Int. Cl.  
*B60G 17/017* (2006.01)

(52) U.S. Cl.  
CPC ........ *B60G 17/017* (2013.01); *B60G 2202/413* (2013.01); *B60G 2202/42* (2013.01); *B60G 2400/0511* (2013.01); *B60G 2400/0512* (2013.01); *B60G 2400/842* (2013.01); *B60G 2400/8422* (2013.01); *B60G 2400/90* (2013.01); *B60G 2500/30* (2013.01); *B60G 2800/019* (2013.01); *B60G 2800/20* (2013.01)

(58) Field of Classification Search  
CPC ............. B60G 17/0525; B60G 21/002; B60G 17/017; B60G 2500/30; B60G 2500/302  
USPC ................... 280/5.503, 5.514, 6.157; 701/36  
See application file for complete search history.

(56) References Cited

U.S. PATENT DOCUMENTS

| | | | |
|---|---|---|---|
| 4,467,250 A * | 8/1984 | Thomasson | 318/436 |
| RE33,626 E * | 7/1991 | Asami et al. | 280/5.517 |
| 5,143,386 A * | 9/1992 | Uriarte | 254/418 |
| 5,231,583 A * | 7/1993 | Lizell | 701/37 |
| 5,913,525 A * | 6/1999 | Schneider et al. | 280/6.153 |
| 2003/0015982 A1* | 1/2003 | Cox-Smith et al. | 318/433 |
| 2005/0237802 A1* | 10/2005 | Santero et al. | 365/185.11 |
| 2006/0081420 A1* | 4/2006 | Ford et al. | 187/224 |
| 2006/0104766 A1* | 5/2006 | Ford et al. | 414/458 |
| 2012/0153581 A1* | 6/2012 | Li | 280/5.514 |
| 2014/0214283 A1* | 7/2014 | Maurer | 701/49 |

* cited by examiner

*Primary Examiner* — James English  
(74) *Attorney, Agent, or Firm* — Renner, Otto, Boisselle & Sklar, LLP.

(57) ABSTRACT

A vehicle 10 includes an electric actuator system 11 that operates according to a method 12 to move the vehicle 10 from an un-level condition to a level condition. The system 11 includes electric actuators 22-25 disposed substantially near the four corners of the vehicle 10 and a controller 32, 33 in electric communication with each of the actuators. The method 12 includes providing electric power at a first predetermined power level to two of the actuators to level the vehicle 10 along one of its X and Y axes. The method 12 further includes simultaneously sensing the attitude of the vehicle 10 along the other of its axes, and changing the power level provided to at least one of the powered actuators to a second predetermined power level to maintain the attitude along the other axis within a predetermined range.

16 Claims, 4 Drawing Sheets

LEVELING METHOD AND SYSTEM WITH VELOCITY COMPENSATION

CROSS REFERENCE TO RELATED APPLICATIONS

The present application references U.S. Provisional Patent Application Ser. No. 61/542,929 filed Oct. 4, 2011 and International Patent Application Serial No PCT/US12/58547 filed on Oct. 3, 2012, the disclosures of which are incorporated herein by reference in their entirety. The present application claims the benefit of the filing date of U.S. Provisional Patent Application Ser. No. 61/778,508 filed Mar. 13, 2013, the disclosure of which is incorporated herein by reference in its entirety.

TECHNICAL FIELD

This invention relates generally to electro-hydraulic and electro-mechanical actuator control systems and control methods. More specifically, this invention relates to electric actuator control systems and methods used with multiple electric actuators to control the attitude of an object.

BACKGROUND OF THE INVENTION

Single or multiple electric actuators are frequently arranged in a system and use a method with a microprocessor based controller that controls electrical power supplied to the electric actuator(s) to control extension and retraction of the actuator(s). The term "electric actuator" means electro-hydraulic actuator and/or electro-mechanical actuator. The term "electro-hydraulic actuator" means a self-contained actuator that converts electrical energy to hydraulic energy and applies the hydraulic energy to cause motion. A typical electro-hydraulic actuator, for example, includes an electric motor that drives a hydraulic pump to pressurize fluid from a reservoir and supply the pressurized fluid to a hydraulic cylinder or other hydraulic motor to cause motion. The term "electro-mechanical actuator" means a self-contained actuator that converts electrical energy to mechanical energy to cause motion. A typical electro-mechanical actuator, for example, includes an electric motor that drives a mechanical rod through a mechanism such as a screw thread to cause motion.

Such systems and methods are used in a wide range of stationary equipment and mobile equipment. One example of this type of system and method is used with mobile equipment to set and hold a platform for the equipment or other object in a predetermined attitude. The term "attitude" means the orientation or inclination of the axes of the object relative to a plane such as a horizontal plane or vertical plane, and the term "level attitude" means the orientation of the axes of the object in a plane substantially at a desired angle (including parallel) to a horizontal plane.

One example of such system and method used with mobile equipment is a leveling system and method used with motorized or towed recreational vehicles. Generally, when recreational vehicles are to be parked for an extended period of time, a set of leveling electric actuators are utilized to level and support the vehicle. Once the recreational vehicle is driven to the location where it will be parked, such as for example a campground or sporting event, the leveling electric actuators are engaged to raise the recreational vehicle and take much of the weight off of the vehicle's tires and to support the vehicle in a generally level attitude.

SUMMARY OF THE INVENTION

The present invention provides a method and system for vehicle leveling, that may reduce or minimize the amount of time required to level a vehicle and that may provide smooth movement of the vehicle during the leveling. Further, the present invention may allow simplification of the vehicle leveling algorithm.

At least one embodiment of the invention provides a method of controlling a plurality of electric actuators on an object to be leveled. The method includes providing an electric controller with electric communication with each of the electric actuators, and providing electric power at a first predetermined power level to at least two of the actuators to simultaneously displace each of the actuators at a first predetermined command velocity. The attitude of the object is sensed, and when the sensed attitude is outside a predetermined range the electric power to at least one of the actuators is changed to a second predetermined power level different from the first predetermined power level supplied to the one actuator. This causes the one actuator to be displaced at a second predetermined command velocity that is different from its first predetermined command velocity.

At least one embodiment of the invention further provides a method in which the object to be leveled is a vehicle having at least four electric actuators, and the electric actuators are controlled in pairs. A pair of actuators is located substantially along each of four sides of the vehicle, and the pairs of actuators on first and second opposite sides of the vehicle control Y attitude of the vehicle while the pairs of actuators on third and fourth opposite sides of the vehicle control X attitude of the vehicle.

At least one embodiment of the invention further provides a method that includes providing electric power simultaneously to a first pair of the actuators along one of the sides of the vehicle at the first predetermined power level while sensing X attitude of the vehicle to bring the X attitude of the vehicle to a substantially level condition. The Y attitude of the vehicle is simultaneously sensed, and when the sensed Y attitude is outside a predetermined range the electric power to at least one of the actuators of the first pair is changed to a second predetermined power level different from the first predetermined power level, to cause the one actuator to be displaced at a second predetermined command velocity that is different from the first predetermined command velocity. This maintains the sensed Y axis attitude substantially within the predetermined range while moving the vehicle to the X attitude level condition.

At least one embodiment of the invention further provides a method in which the first predetermined power level is substantially equal for each of the two actuators. The first predetermined power level is substantially the maximum power level to extend each of the actuators at a substantially maximum command velocity, and the second predetermined power level is less than the first predetermined power level. The method further includes returning the electric power to the one actuator to substantially the first predetermined power level after changing the electric power to the one actuator to the second predetermined power level and after causing the sensed Y attitude to return to the predetermined range.

These and other features of the invention are more fully described and particularly pointed out in the description and claims set out below, and this Summary is not intended to identify key features or essential features of the claimed subject matter. The following description and claims and the annexed drawings set forth in detail certain illustrative embodiments of the invention, and these embodiments indicate but a few of the various ways in which the principles of the invention may be used.

BRIEF DESCRIPTION OF THE DRAWINGS

Embodiments of this invention will now be described in further detail with reference to the accompanying drawings, in which.

DETAILED DESCRIPTION OF THE DRAWINGS

Figure 1:
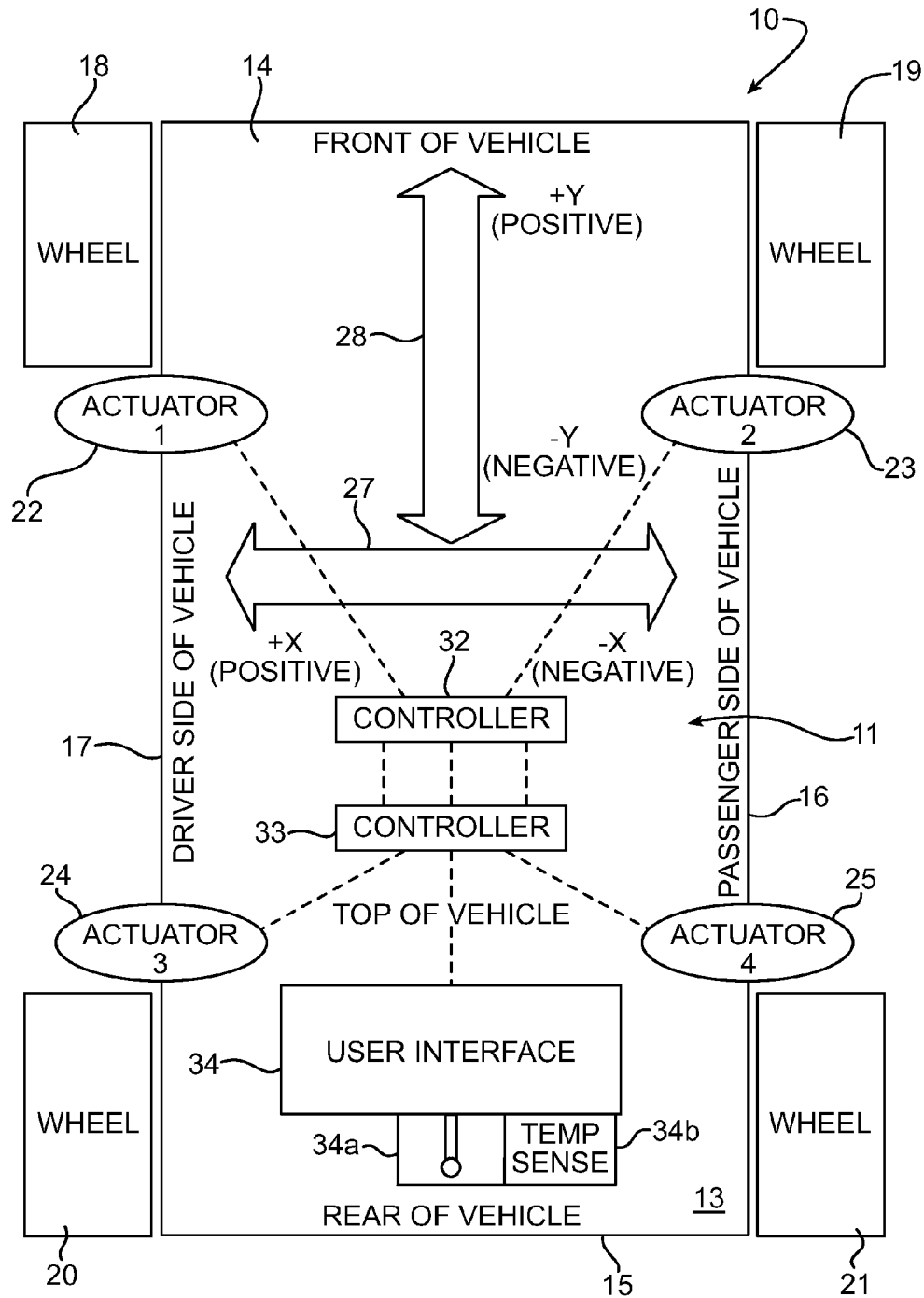
FIG. 1 is a schematic representation of a wheeled land vehicle that includes the method and system according to a preferred embodiment of the present invention, with the vehicle viewed from the top.

Referring now to the drawings in greater detail, FIGS. 1-5 illustrate an object 10 having an electric actuator system 11 that operates according to a method 12, all according to a preferred embodiment of the present invention. The object 10 can be any object that is to be moved with controlled movement, and in the preferred embodiment the object 10 is, for example, a motorized recreational land vehicle 10 that transports humans and cargo on roadways and provides lodging when the vehicle 10 is parked. The electric actuator system 11 can be used in a wide variety of applications to move objects, and in the preferred embodiment the system 11 is, for example, a leveling system for moving the recreational vehicle 10 to a substantially level attitude when the vehicle 10 is to be parked for an extended period of time.

Referring to FIG. 1, the vehicle 10 includes a frame e and body combination 13, a front 14, a rear 15, a passenger side 16, a driver side 17, and wheels 18-21. The electric actuator system 11 includes electric actuators 22-25 that are each permanently affixed to the frame at any suitable location, such as, for example, near each of the corners and wheels 18-21. The actuators 22-25 are preferably identical to one another, and in the embodiments described below are identical to one another except as otherwise described. The electric actuators may be of any type, and in the preferred embodiment each actuator 22-25 is, for example, an electro-hydraulic actuator having an integral electric motor (not shown), hydraulic pump (not shown), and hydraulic cylinder. When electrical power is supplied to the electric motor, the electric motor drives the hydraulic pump to pump hydraulic fluid to one side of the hydraulic cylinder. The hydraulic cylinder of each actuator 22-25 extends a rod or base 22a-25a in a downward direction to engage the ground (not shown) and raise the vehicle 10, or retracts in an upward direction to lower the vehicle 10 and move away from the ground, depending upon the rotation direction of the electric motor and the flow direction of the hydraulic fluid. Electro-hydraulic actuators of this type are well known, and other types of electro-hydraulic actuators or electro-mechanical actuators may be used in place of the described actuators 22-25 of the preferred embodiment illustrated in the drawings.

When the vehicle 10 is parked, the ground or other surface on which the wheels 18-21 rest is often not level about the vehicle's side to side or X axis 27 or about its front to back or Y axis 28. When the driver side 17 is at a higher elevation or attitude relative to the passenger side 16 than desired, a condition about the X axis 27 exists that is referred to as +X. Similarly, when the passenger side 16 is at a higher elevation or attitude relative to the driver side 17 than desired, a condition along the X axis 27 exists that is referred to as −X. When the front 14 is at a higher elevation or attitude relative to the rear 15 than desired, a condition along the Y axis 28 exists that is referred to as +Y. Similarly, when the rear 15 is at a higher elevation or attitude relative to the front 16 than desired, a condition along the Y axis 28 exists that is referred to as −Y. When a condition of the parked vehicle 10 exists that is characterized by +X or −X, and/or +Y or −Y, the vehicle leveling system 11 and method 12 operate to move the vehicle 10 from that condition to a level attitude condition.

The electric actuator system 11 further includes a first control module or microprocessor based controller 32, a second control module or microprocessor based controller 33, and a user interface 34. The controllers 32 and 33 each include input/output connections described further below, and the controllers 32, 33 may alternatively be a single controller. The controllers 32 and 33 operate cooperatively and are together referred to herein as "controller 32, 33." The user interface 34 includes, for example, an LCD screen or other text capable screen for user feedback by the system 11 and control buttons described below (or a screen that is a touch screen to provide the button functions) to enable user input to the controller 32, 33. A level attitude sensor 34a and a temperature sensor 34b are connected to provide inputs to controller 32, 33 as further described below, and the level attitude sensor 34a and temperature sensor 34b may alternatively be provided as integral unit components or may be integral with the user interface 34. The level sensor 34a may be of any desired type, and in the preferred embodiment the level sensor 34a may be a known three axis accelerometer sensor that senses both X and Y attitude and that permits the level sensor 34a to be mounted in a variety of orientations. The temperature sensor 34b may also be of any desired type. Both the level sensor 34a and the temperature sensor 34b play a role in the system 11 and method 12 as further discussed below. The temperature sensor 34b senses the ambient temperature outside the vehicle, to approximate the temperature of each of the actuators 22-25. Temperature sensors connected to sense the individual operating temperatures of the actuators could alternatively be used, but this additional complexity is typically not cost justified. If desired, the controller 33 can be programmed to interface with parking brake and air bag controls or other controls of the vehicle 10, for example, to assure the vehicle parking brake is actuated and the air bags are disabled or that other conditions are met when the leveling system 11 is to be used. Wiring harness connections provide suitable two way electrical connections between these components and the electric actuators 22-25, and certain of these wire harnesses could alternatively be replaced with wireless connections. These connections can include, for example, controller area network communication (not shown), power (not shown), positive (not shown) and negative (not shown).

The controller 32 is programmed to carry out the method 12 described more fully below to control electric actuators 22 and 23, and controller 33 is programmed in a similar manner to carry out the method 12 to control actuators 24 and 25. The controllers 32 and 33 are identical to one another from a hardware standpoint and are only slightly different in their software programs to accommodate the slightly different functions and connections illustrated in FIG. 1 and/or described below.

In some applications for the actuator system 11 it may be desirable to provide more than the four electric actuators 22-25 illustrated in FIG. 1. For example, in some applications such as relatively large land vehicle trailers known as fifth wheel trailers, the frame of the vehicle might not be as rigid as the frame of the motorized vehicle 10 so that the use of six electric actuators rather than four may be desirable. The system 11 and method 12 according to the present invention allow these changes while using controllers and a user interface that are identical from a hardware standpoint and while using wiring harnesses and electric actuators and temperature sensors and level sensors that are also identical.

When it is desired to level the vehicle 10, it is known to employ a three step process in which, for example, the vehicle is first leveled front to back, then leveled side to side, and then leveled front to back again. For example, if the front 14 of the vehicle 10 is lower than the rear 15, the two front actuators 22 and 23 are extended in a first step until a front to back Y level attitude is achieved. If the passenger side 16 of the vehicle 10 is then lower than the driver side 17, the two passenger side actuators 23 and 25 are extended in a second step until a side to side X level attitude is achieved. Because it is inherent in identical actuators that they do not extend or retract at exactly the same velocity even when supplied with the same command power, this side to side X leveling necessarily may un-level the front to back Y attitude of the vehicle 10. This requires a third step of the leveling method, which is to again level the front to back Y attitude of the vehicle 10 by, for example, extending the actuators 22, 23 or 24, 25.

Figure 2:
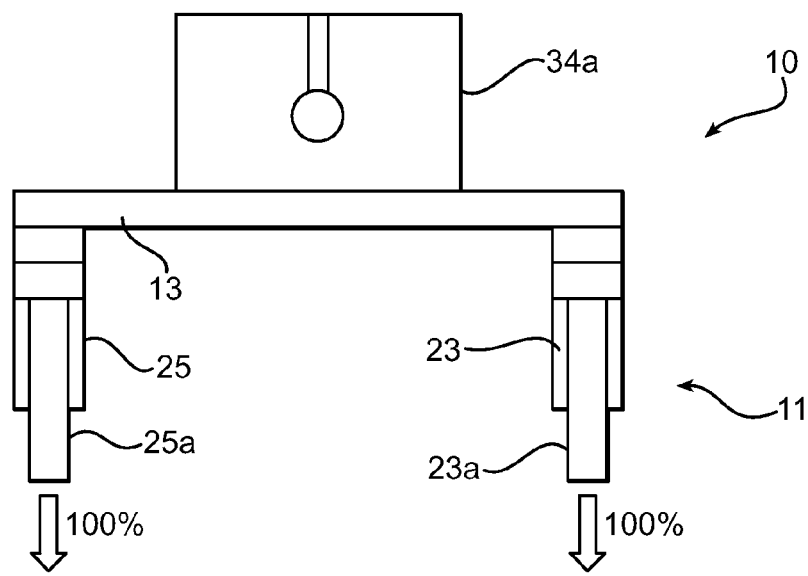
FIG. 2 is a schematic representation of the wheeled land vehicle shown in FIG. 1, showing two of the four or more electric actuators of the vehicle extending at a first predetermined velocity, for example, 100% velocity.
Figure 3:
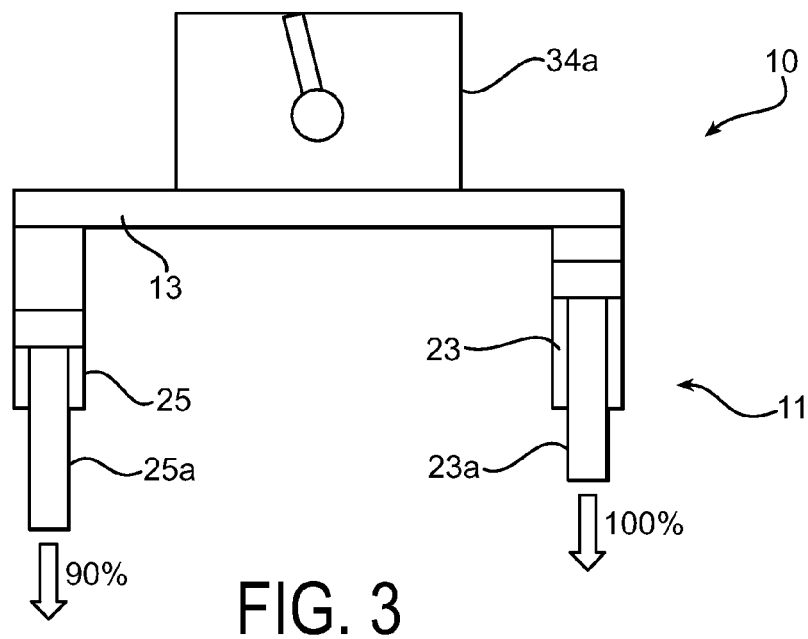
FIG. 3 is a schematic representation similar to FIG. 2, but showing one of the two electric actuators extending at the first predetermined velocity and the other electric actuator extending at a reduced velocity, for example, 90% velocity.
Figure 4:
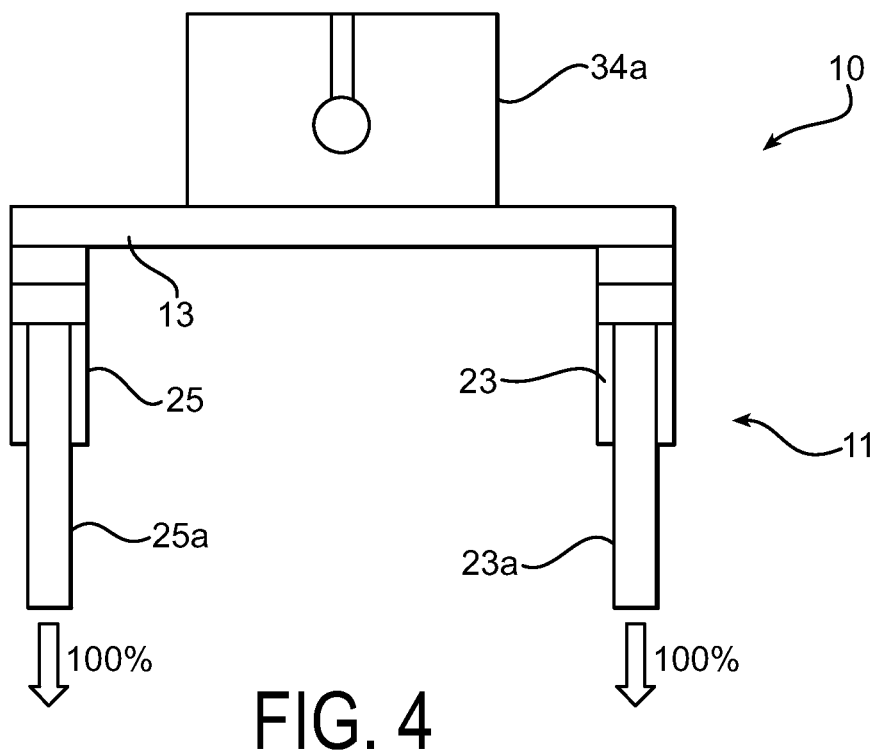
FIG. 4 is a schematic representation similar to FIG. 2, but again showing the two electric actuators extending at the first predetermined velocity.

Referring now to FIGS. 1-4, the present invention provides a system 11 and method 12 that eliminate or minimize the need for the above described third step, that decrease the time required to level the vehicle 10, that allow the vehicle 10 to be leveled more smoothly, and that simplify the vehicle leveling algorithms for the controller 32, 33. FIGS. 2-4 illustrate the vehicle 10, system 11, method 12, frame and body combination 13, passenger side actuators 23 and 25, and level sensor 34a described above and shown in FIG. 1.

According to one embodiment of the invention, for example, assume the front 14 of vehicle 10 is lower than the rear 15 (which is a −Y attitude) and the passenger side 16 of vehicle 10 is lower than driver side 17 (which is a +X attitude). In this example, the system 11 and method 12 in a first step seeks and achieves a Y level condition. The controller 32, 33 provides electric power at a first predetermined command power level to the two front actuators 22, 23 to simultaneously extend or displace actuators 22, 23 at a command velocity to raise the front 14 and level the vehicle 10 in the front to back or Y attitude. Preferably, the first predetermined command power level is the maximum or substantially 100% power level supplied to extend actuators 22, 23 at their substantially maximum extending velocity to level vehicle 10 in a minimum amount of time. During all described steps, level sensor 34a substantially continuously simultaneously senses both X and Y attitude and provides that sensed attitude as a feedback signal to controller 32, 33.

Once a Y level attitude is achieved in the first step, a second step smoothly follows the first step to seek and achieve an X level attitude. In this example, the controller 32, 33 in the second step provides electric power at a first predetermined command power level to the two passenger side actuators 23 and 25 to initially extend or displace actuators 23, 25 at a first predetermined command velocity which preferably may be, for example, substantially 100% or maximum command power level and velocity for each actuator, to raise the passenger side 16 of vehicle 10 to seek a side to side or X level attitude as monitored by level sensor 34a. As the actuators 23 and 25 each extends at its first predetermined command velocity in the second step to seek a side to side X level attitude, the level sensor 34a continues to simultaneously monitor the front to back Y attitude of vehicle 10 as well as the X attitude. As illustrated in FIG. 2, level sensor 34a is indicating a front to back Y level attitude within an acceptable range as the X level or second step begins. As the actuators 23 and 25 continue to extend in step two to seek a side to side X level attitude, the inherent velocity difference in their actual velocities from their commanded velocities may cause the actuators 23 and 25 to begin to cause an un-level front to back Y attitude, which is sensed by level sensor 34a. If the front to back Y attitude approaches or reaches an unacceptable −Y un-level condition outside a first predetermined range in step two, the system controller 32, 33 slows actuator 25 by changing the command power level provided to actuator 25 to a second predetermined command power level that is less than, for example 90% of, its first predetermined or maximum command power level. This slows actuator 25 to a second predetermined command velocity which may be, for example, 90% of its first predetermined or maximum command velocity. As actuator 25 slows, actuator 23 continues to be provided with its first predetermined command power level to continue to extend at its first predetermined substantially 100% command velocity. As actuator 25 continues to extend at its second predetermined 90% velocity while actuator 23 continues to extend at its first predetermined substantially 100% velocity in step two, vehicle 10 will maintain or again achieve a front to back Y level attitude during step two within an acceptable range. When that occurs, sensor 34a as illustrated in FIG. 4 signals such Y level condition to the controller 32, 33. The controller 32, 33 then powers both actuator 23 and actuator 25 at the first predetermined or substantially 100% command power level and velocity as illustrated in FIG. 4 to continue step two, until the side to side X level attitude is achieved and sensed by sensor 34a. At this point, vehicle 10 has both a side to side X level attitude within an acceptable range and a front to back Y level attitude within an acceptable range. In this manner, the Y attitude is adjusted and maintained within an acceptable range in the second step simultaneously with actuator 23, 25 extension that is seeking the X level attitude. The above described prior art step three is eliminated, and the system 11 and method 12 have leveled vehicle 10 in less time than a previous system and method. Further, due to the described extension of actuators 23 and 25 at different commanded velocities, the system 11 and method 12 according to the invention also provides a smoother leveling for the vehicle 10 than a previous system and method.

Figure 5:
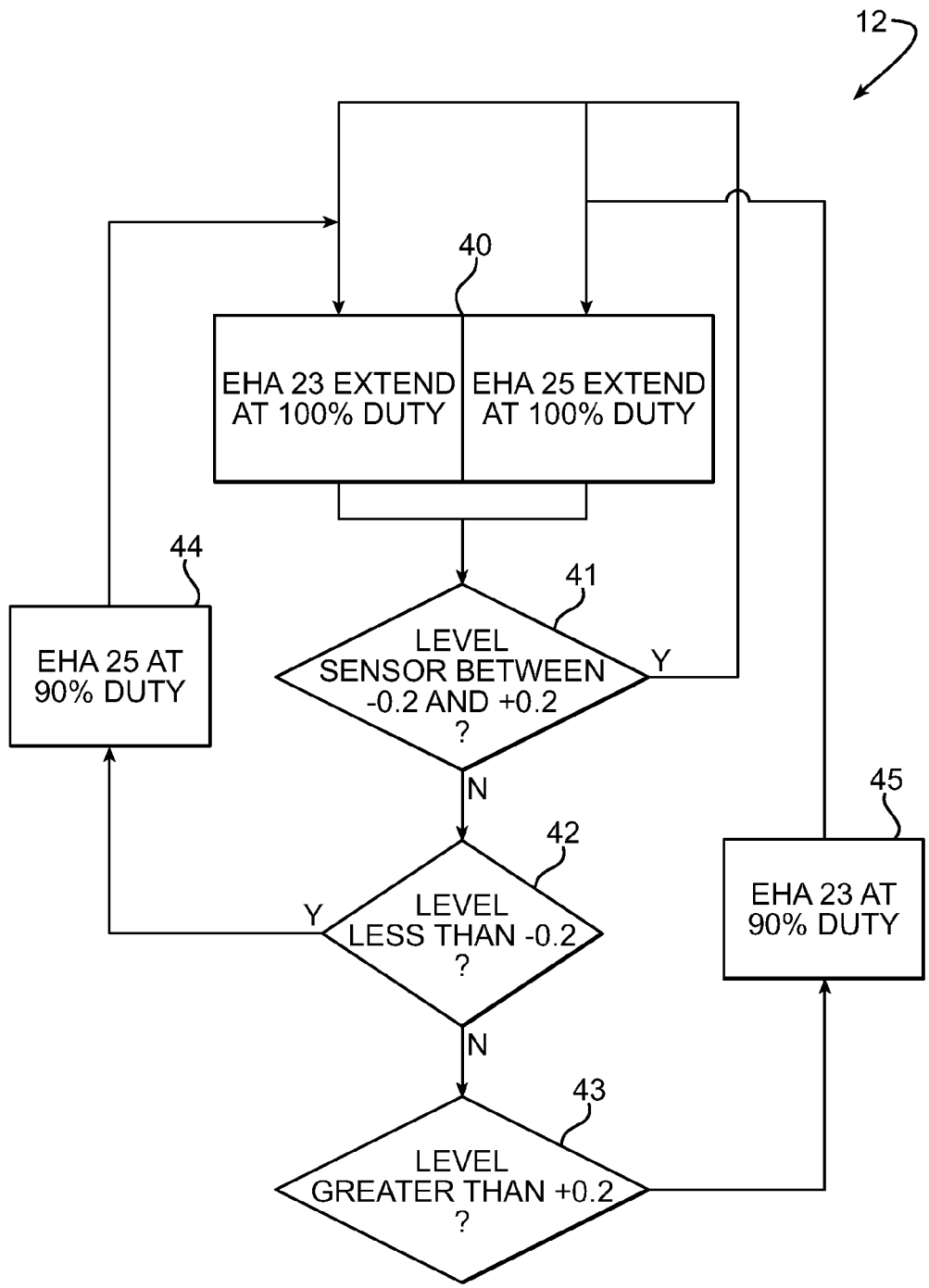
FIG. 5 is a flow chart showing a portion of the method and system according to the preferred embodiment of the present invention.

FIG. 5 illustrates a flow chart for the above described second step of the method 12 and system 11 according to an embodiment of the present invention. At sub-step 40, actuators 23 and 25 are each being powered by the controller 32, 33 at a first predetermined command power level (for example, substantially 100%) to extend at its first predetermined, (for example, substantially 100%), command velocity to seek an X level attitude. At sub-step 41, level sensor 34a senses and signals to the controller 32, 33 the front to back Y level attitude of vehicle 10 to indicate if the front to back Y level attitude is within a predetermined range indicated as between +0.2 and −0.2. If the front to back Y level attitude is within that range as indicated by yes in FIG. 5, controller 32, 33 continues to provide the first predetermined command power level to actuators 23 and 25 so that each continues to extend at its first predetermined command velocity. If the front to back Y level attitude is not within that range as indicated by no in FIG. 5, the controller 32, 33 will determine which actuator should be slowed at sub-step 42 or 43 and will reduce the command power at sub-steps 44 or 45 to reduce the command velocity of actuator 23 or actuator 25 to a second predetermined command power level and command velocity which may be, for example, 90% at step 44 or 45 while maintaining the command power and command velocity of the other actuator at, for example, its first predetermined 100%. If Y level sensor 34a indicates a Y level condition within the acceptable range as actuators 23 and 25 continue to extend, the controller 32, 33 will again provide command power to each actuator 23 and 25 at its first predetermined or substantially 100% command power level to extend actuators 23 and 25 at their first predetermined command velocity. When a side to side X level attitude within an acceptable range is achieved and sensed by the level sensor 34a, the controller 32, 33 will terminate further power to actuators 23 and 25. At this point, vehicle 10 is level within an acceptable range in both the side to side X attitude and the front to back Y attitude.

According to an alternate embodiment of the invention, the method 12 and system 11 in the second step described above make additional real time adjustments in actuator commanded power level and velocity in response to continuously sensed level attitude. The method 12 and system 11 according to the alternate embodiment of the invention are the same as the first embodiment of the invention described above, except as described in this paragraph. In the second embodiment, if during the second step the sensed Y attitude deviates from the first predetermined acceptable −0.2 to +0.2 range for more than a predetermined time period, or deviates outside a second predetermined greater range (for example, −0.3 to +0.3), the system controller 32, 33 further slows actuator 25 by changing the commanded power level provided to actuator 25 to a third predetermined command power level that is less than, for example 80% of, its first predetermined or maximum command power level. This slows actuator 25 to a third predetermined command velocity which may be, for example, 80% of its first predetermined or maximum command velocity. As actuator 25 slows further, actuator 23 continues to be provided with its first predetermined command power level to continue to extend at its first predetermined substantially 100% command velocity. As actuator 25 continues to extend at its third predetermined 80% velocity while actuator 23 continues to extend at its first predetermined substantially 100% velocity in step two, the Y level attitude of vehicle 10 will return to within the second predetermined −0.3 to +0.3 range but outside the first predetermined −0.2 to +0.2 range. When that occurs, the controller 32, 33 will change the commanded power level to actuator 25 to the second predetermined commanded power level (for example, 90%) until vehicle 10 is moved into its front to back Y level attitude during step two within its first acceptable −0.2 to +0.2 range. When that occurs, sensor 34a as illustrated in FIG. 4 signals such Y level condition to the controller 32, 33. The controller 32, 33 then powers both actuator 23 and actuator 25 at the first predetermined or substantially 100% command power level and velocity as to continue step two, until the side to side X level attitude is achieved and sensed by sensor 34a. At this point, vehicle 10 has both a side to side X level attitude within an acceptable range and a front to back Y level attitude within an acceptable range.

Although the principles, embodiments and operation of the present invention have been described in detail herein, this is not to be construed as being limited to the particular illustrative forms disclosed. For example, the method sequence could be side to side first, or front to back first. Also, the desired attitude can be other than parallel to a horizontal plane. Further, the deviation that triggers the change in command power and command velocity can be other than 0.2 or 0.3, the reduced command power and command velocity can be other than 90% or 80%, the first predetermined command power and command velocity can be different for different actuators, and the first predetermined command power and command velocity can be other than 100%. Further, other or further deviations can trigger other or further changes to increase or decrease command power and command velocity. Further, the system 10 and method 11 can be applied to vehicles with numbers of actuators other than four. Also, if the first predetermined command power and command velocity for the actuators is less than 100%, the change in command power and command velocity can be achieved by increasing command power and velocity rather than decreasing command power and velocity or can be achieved by increasing command power and velocity of one actuator and decreasing command power and velocity of another. Further, the invention can be applied to the first step described above, so that, for example, command power provided to the actuators during the first step Y leveling can be modulated according to sensed X attitude to minimize X attitude deviation from level during Y leveling. Further, the X attitude of the vehicle can be front to rear while the Y attitude can be side to side. Further, the invention can be incorporated into a fully automatic vehicle leveling system or into a manual control leveling system. It will thus become apparent to those skilled in the art that various modifications of the embodiments herein can be made without departing from the spirit or scope of the invention.

The invention claimed is:

1. A method of controlling the displacement velocity of a plurality of electric actuators on an object to be leveled comprising the steps:
   providing an electric controller with electric communication with each of the electric actuators;
   providing electric power at a first predetermined power level to at least two actuators of the plurality of the actuators to simultaneously displace each of the at least two actuators at a predetermined command velocity;
   sensing the attitude of the object;
   when the sensed attitude is outside a first predetermined range, changing the electric power to at least one actuator of the at least two actuators to a second predetermined power level different from the first predetermined power level supplied to the at least one actuator, to cause the one actuator to be displaced at a second predetermined command velocity that is different from its first predetermined command velocity.

2. The method of controlling the plurality of electric actuators as set forth in claim 1, including:
   sensing an X and Y direction attitude of the object to which the at least two actuators are connected;
   communicating the sensed attitude as an input to the controller;
   moving the object from an un-level attitude position to a level attitude position by operation of the at least two actuators.

3. The method of controlling the plurality of electric actuators as set forth in claim 2, wherein:
   the sensed X direction attitude is used as an input to change the electric power and command velocity of the at least two actuators that are seeking a Y direction level condition.

4. The method of controlling the plurality of electric actuators as set forth in claim 3, wherein the object is a vehicle having the plurality of actuators, wherein the plurality of actuators comprise at least four electric actuators, and the at least four electric actuators are controlled in pairs.

5. The method of controlling the plurality of electric actuators as set forth in claim 4, wherein a pair of actuators of the plurality of actuators is located substantially along each of four sides of the vehicle, the vehicle has an X axis and a Y axis, first and second pairs of actuators on first and second opposite sides of the vehicle control Y attitude of the vehicle, and third and fourth pairs of actuators on third and fourth opposite sides of the vehicle control X attitude of the vehicle.

6. The method of controlling the plurality of electric actuators as set forth in claim 5, including providing electric power simultaneously to the first pair of the actuators along one of the sides of the vehicle at the first predetermined power level while sensing X attitude of the vehicle to bring the X attitude of the vehicle to a substantially level condition, simultaneously sensing the Y attitude of the vehicle, and when the sensed Y attitude is outside a predetermined range, changing the electric power to at least one of the actuators of the first pair to a second predetermined power level different from the first predetermined power level, to cause the at least one actuator to be displaced at a second predetermined command velocity that is different from the first predetermined command velocity to maintain the sensed Y axis attitude substantially within the predetermined range while moving the vehicle to the X attitude level condition.

7. The method of controlling the plurality of electric actuators as set forth in claim 1, including maintaining the power level to another actuator of the at least two actuators substantially at the first predetermined power level while changing the power level to the at least one actuator to the second predetermined power level.

8. The method of controlling the plurality of electric actuators as set forth in claim 1, wherein the first predetermined power level is substantially equal for each of the at least two actuators.

9. The method of controlling the plurality of electric actuators as set forth in claim 1, wherein the first predetermined power level is different for each of the at least two actuators.

10. The method of controlling the plurality of electric actuators as set forth in claim 8, wherein the second predetermined power level is less than the first predetermined power level supplied to the at least one actuator.

11. The method of controlling the plurality of electric actuators as set forth in claim 8, wherein the second predetermined power level is greater than the first predetermined power level supplied to the at least one actuator.

12. The method of controlling the plurality of electric actuators as set forth in claim 1, wherein the first predetermined power level is substantially the maximum power level to extend each of the at least two actuators at a substantially maximum command velocity, and the second predetermined power level is less than the first predetermined power level.

13. The method of controlling the plurality of electric actuators as set forth in claim 1, including returning the electric power to the at least one actuator to substantially the first predetermined power level after changing the electric power to the at least one actuator to the second predetermined power level and after causing the sensed attitude to return to the predetermined range.

14. The method of controlling the plurality of electric actuators as set forth in claim 1, including when the sensed attitude is outside a second predetermined range, changing the electric power to the at least one actuator to a third predetermined power level different from the first and second predetermined power levels supplied to the at least one actuator, to cause the at least one actuator to be displaced at a third predetermined command velocity that is different from the first and second predetermined command velocities.

15. The method of controlling the plurality of electric actuators as set forth claim 14, wherein the second predetermined range is greater than the first predetermined range, and the third predetermined power level is less than the second predetermined power level.

16. A multiple electric actuator system having the electric controller, a level sensor and the plurality of electric actuators for performing the method of claim 1.

* * * * *